(12) United States Patent
Byrne et al.

(10) Patent No.: US 10,897,149 B2
(45) Date of Patent: Jan. 19, 2021

(54) STORAGE TOTE WITH ELECTRICAL OUTLETS

(71) Applicants: Norman R. Byrne, Ada, MI (US); Peter Stathis, San Francisco, CA (US)

(72) Inventors: Norman R. Byrne, Ada, MI (US); Peter Stathis, San Francisco, CA (US)

(*) Notice: Subject to any disclaimer, the term of this patent is extended or adjusted under 35 U.S.C. 154(b) by 0 days.

(21) Appl. No.: 15/857,031

(22) Filed: Dec. 28, 2017

(65) Prior Publication Data

US 2018/0183250 A1    Jun. 28, 2018

Related U.S. Application Data

(60) Provisional application No. 62/439,615, filed on Dec. 28, 2016.

(51) Int. Cl.

| | |
|---|---|
| *H02J 7/00* | (2006.01) |
| *B65D 25/04* | (2006.01) |
| *B65D 25/28* | (2006.01) |
| *H01R 13/73* | (2006.01) |
| *H01R 25/00* | (2006.01) |
| *H01R 27/00* | (2006.01) |
| *H02J 7/02* | (2016.01) |

(52) U.S. Cl.
CPC ............ *H02J 7/0044* (2013.01); *B65D 25/04* (2013.01); *B65D 25/2891* (2013.01); *H01R 13/73* (2013.01); *H01R 25/006* (2013.01); *H01R 27/00* (2013.01); *H02J 7/0013* (2013.01); *H02J 7/0027* (2013.01); *H02J 7/0042* (2013.01); *H02J 7/025* (2013.01)

(58) Field of Classification Search
CPC ...... H02J 7/0044; H02J 7/0042; H02J 7/0027; H02J 7/0013; H02J 7/025; H01R 27/00; H01R 25/006; H01R 13/73; B65D 25/2891; B65D 25/04

USPC .......................................... 320/107, 111, 114
See application file for complete search history.

(56) References Cited

U.S. PATENT DOCUMENTS

| | | |
|---|---|---|
| 5,339,956 A | 8/1994 | Thomason |
| 5,503,571 A | 4/1996 | Cheslock |
| 5,772,036 A | 6/1998 | Muncy et al. |
| 5,810,168 A | 9/1998 | Eggering |
| 6,192,805 B1 | 2/2001 | Saylor et al. |
| 6,784,364 B2 | 8/2004 | Kochanski et al. |

(Continued)

FOREIGN PATENT DOCUMENTS

WO        97/49161        12/1997

*Primary Examiner* — Richard Isla
*Assistant Examiner* — Manuel Hernandez
(74) *Attorney, Agent, or Firm* — Gardner, Linn, Burkhart & Ondersma LLP

(57) ABSTRACT

A storage tote assembly includes a lower storage bin, an upper storage tote that is selectively attachable to the lower storage bin, and at least one electrical power outlet inside the lower storage bin. The lower storage bin has a bottom panel and at least one bin sidewall that extends up from the bottom panel to define the lower storage chamber. The upper storage tote has a lower portion that selectively engages the bin sidewall at an open top thereof. The lower portion of the storage tote and at least one tote sidewall cooperate to define an upper storage area for loose articles. The power outlet is energized by an external power source or an onboard power supply, to provide electrical power to a portable electrical or electronic device.

2 Claims, 4 Drawing Sheets

(56) References Cited

U.S. PATENT DOCUMENTS

| | | |
|---|---|---|
| 6,976,744 B2 | 12/2005 | Hay et al. |
| 7,021,637 B2 | 4/2006 | Snider et al. |
| 7,222,031 B2 | 5/2007 | Heatley |
| 7,628,271 B1* | 12/2009 | Marton ................. G06F 1/1628 |
| | | 206/305 |
| 8,076,900 B1 | 12/2011 | Brown |
| 8,456,819 B1 | 6/2013 | Smith |
| 9,144,281 B2* | 9/2015 | Cross ...................... A45C 5/14 |
| 9,484,751 B2 | 11/2016 | Byrne et al. |
| 9,539,722 B2 | 1/2017 | Martinez et al. |
| 9,566,704 B1 | 2/2017 | Stoikos et al. |
| 10,181,735 B2 | 1/2019 | Byrne et al. |
| 10,413,058 B2* | 9/2019 | Kuhn ................... A47B 88/407 |
| 2002/0171335 A1 | 11/2002 | Held |
| 2005/0156564 A1 | 7/2005 | Krieger |
| 2008/0035507 A1* | 2/2008 | Collister ................ B25H 3/006 |
| | | 206/349 |
| 2009/0267561 A1* | 10/2009 | Lin ......................... H02J 50/12 |
| | | 320/108 |
| 2010/0127661 A1* | 5/2010 | Stocking ............... H02J 7/0044 |
| | | 320/115 |
| 2010/0171465 A1* | 7/2010 | Seal ................... G03G 15/5004 |
| | | 320/114 |
| 2010/0213892 A1* | 8/2010 | DeSanctis ............ H01R 25/006 |
| | | 320/107 |
| 2010/0231161 A1* | 9/2010 | Brown ..................... B25H 3/02 |
| | | 320/101 |
| 2011/0115430 A1* | 5/2011 | Saunamaki ............. H02J 5/005 |
| | | 320/108 |
| 2013/0234481 A1 | 9/2013 | Johnson |
| 2013/0285606 A1 | 10/2013 | Ben-Shalom et al. |
| 2014/0166516 A1* | 6/2014 | Martinez ................ A45C 3/001 |
| | | 206/372 |
| 2014/0327387 A1* | 11/2014 | Romanenko .......... H02J 7/0027 |
| | | 320/107 |
| 2015/0123614 A1* | 5/2015 | Cover ................... H02J 7/0003 |
| | | 320/110 |
| 2015/0326044 A1* | 11/2015 | Ashley .................... H02J 7/342 |
| | | 320/103 |
| 2015/0351263 A1 | 12/2015 | DeSanctis |
| 2017/0077724 A1* | 3/2017 | Clark .................... H02J 7/0045 |
| 2017/0302099 A1* | 10/2017 | Bolden .................. H02J 7/025 |
| 2018/0116360 A1* | 5/2018 | Caroli ...................... A45C 3/06 |

* cited by examiner

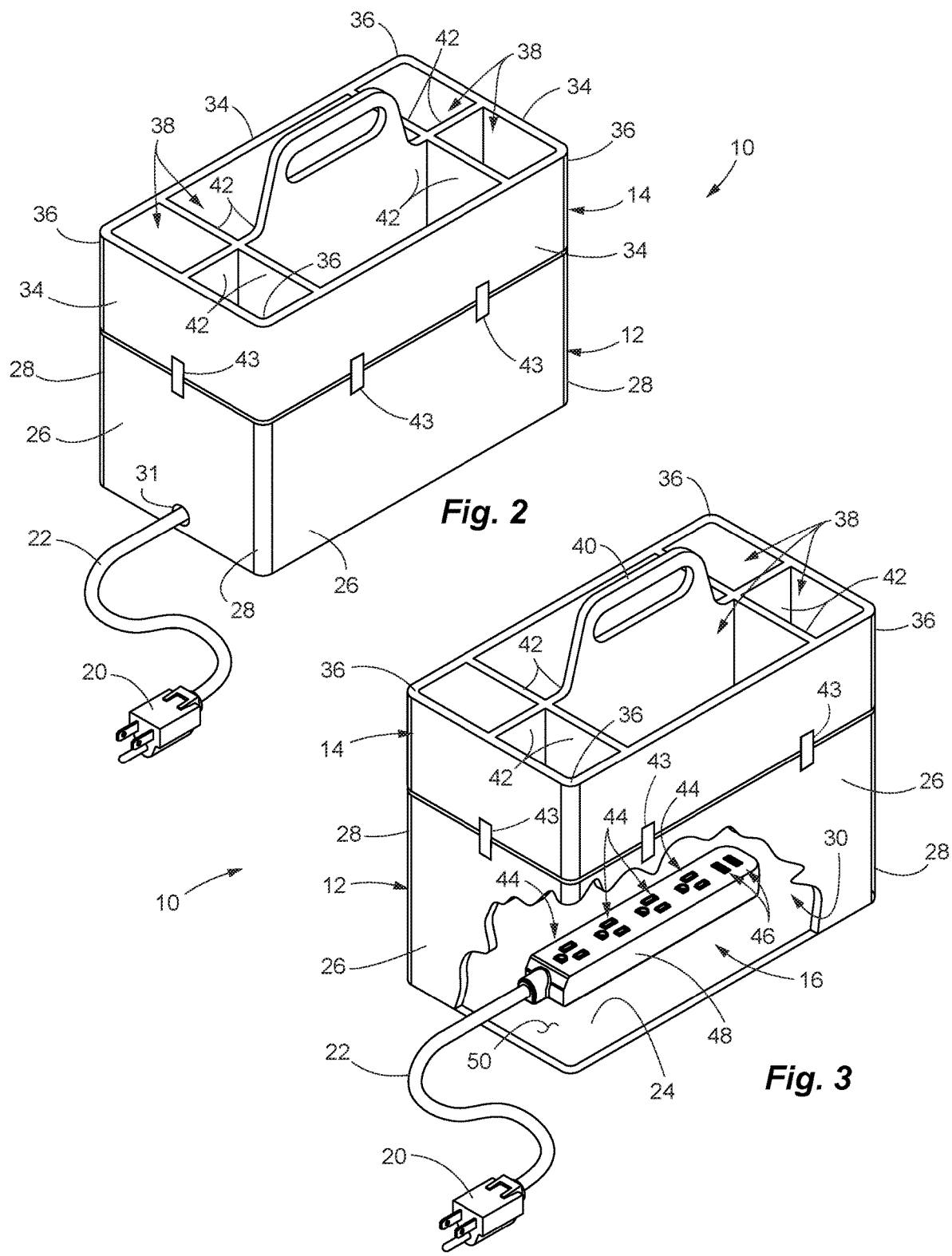

STORAGE TOTE WITH ELECTRICAL OUTLETS

CROSS REFERENCE TO RELATED APPLICATION

The present application claims the benefit of U.S. provisional application Ser. No. 62/439,615, filed Dec. 28, 2016, which is hereby incorporated herein by reference in its entirety.

FIELD OF THE INVENTION

The present invention relates to portable storage devices for loose articles, and to electrical power distribution.

BACKGROUND OF THE INVENTION

Portable storage bins and totes provide space in which a user can organize, store, and transport loose articles, such as tools or supplies for various hobbies or work tasks.

SUMMARY OF THE INVENTION

The present invention provides a storage tote assembly for the convenient storage and transporting of loose articles, and also for recharging portable electronic devices or powering other electrical or electronic devices, such as mobile phones, media players, small computers, or electrically powered appliances or tools. The electrical outlets may be energized by connecting a power cord to an outside power source, or by an onboard power storage device such as a battery or a capacitor. The storage tote assembly includes a lower storage bin that contains the electrical outlets and provides loose article storage, plus an upper storage tote that is selectively attachable to (and separable from) the lower storage bin and provides additional storage space for loose articles. Such articles may include office tools and appliances, crafting items, electronic gaming items, food preparation, and the like.

In one form of the present invention, a storage tote assembly includes an upper storage tote that is attachable to a lower storage bin, with at least one electrical power outlet positioned inside the lower storage bin. The lower storage bin has a bottom panel and one or more bin sidewalls that extend up from the bottom panel to define a lower storage chamber. The upper storage tote has a lower portion that is received by the bin sidewall(s), with a lower panel of the storage tote and at least one tote sidewall cooperating to define an upper storage area for loose articles. The electrical power outlet(s) are capable of supplying electrical power to a portable electrical or electronic device, such as a mobile phone, a media player, a tablet computer, or a small appliance or tool.

According to one aspect, the storage tote assembly includes an electrical power cord in electrical communication with the electrical power outlet, and the bin sidewall defines an opening through which the electrical power cord exits the lower storage chamber for connection to an outside power source.

According to another aspect, the electrical power outlet includes at least one low voltage DC power outlet and at least one high voltage AC power outlet. Optionally, an electrical power converter positioned in the lower storage chamber and is operable to convert incoming high voltage AC power to a low voltage DC power output that is supplied to the low voltage DC power outlet.

According to still another aspect, there is provided a power outlet housing in which the electrical power outlet is mounted. The power outlet housing is coupled to an upper surface of the bottom panel. Optionally, the power outlet housing is releasably coupled to an upper surface of the bottom panel.

According to yet another aspect, a securing element is provided for attaching the upper storage tote to the lower storage bin. For example, the securing element may take the form of a hook-and-loop fastener, a resilient hinge, snap buttons, magnetic fasteners, or slide fasteners.

According to a further aspect, the upper storage tote includes a divider wall for compartmentalizing the upper storage area into two or more upper storage area portions. Optionally, the upper storage area is uncovered.

According to a still further aspect, the upper storage tote includes a carry handle configured to permit carrying the upper storage tote and the lower storage bin together as a unit when the storage tote is releasably coupled to the lower storage bin.

According to another aspect, there is an electrical storage device disposed in the lower storage chamber. The electrical storage device is in electrical communication with the electrical outlet in the lower storage chamber. Optionally, the electrical storage device includes a rechargeable battery or capacitor.

According to yet another aspect, there is provided a power outlet housing in which the at least one electrical power outlet is mounted. Optionally, the electrical power outlet includes a low voltage DC power outlet.

According to a still further aspect, a wireless power receiver is positioned along the bottom panel or the bin sidewall, and is operable to wirelessly receive electrical power from a remotely located wireless power transmitter. The wireless power receiver conveys the electrical power to the electrical storage device in order to recharge the electrical storage device. Optionally, there is a wireless power transmitter positioned in the lower storage chamber and operable to wirelessly convey electrical power to at least one portable electrical or electronic device positioned in the lower storage chamber.

Therefore, the storage tote assembly provides users with access to portable storage space and also to electrical charging outlets for recharging portable electronic devices, electrical tools or appliances, and the like. Corded versions may be plugged in to an available electrical outlet, such as in a work area, to energize the one or more electrical outlet in the storage tote assembly, while wireless versions may have an onboard rechargeable battery to provide at least limited electrical power to other devices.

These and other objects, advantages, purposes and features of the present invention will become apparent upon review of the following specification in conjunction with the drawings.

BRIEF DESCRIPTION OF THE DRAWINGS

FIG. 2 is an upper perspective view of the storage tote with electrical outlets;

FIG. 3 is another upper perspective view of the storage tote, with portions cut away to show internal structure;

DESCRIPTION OF THE PREFERRED EMBODIMENTS

Figure 1:
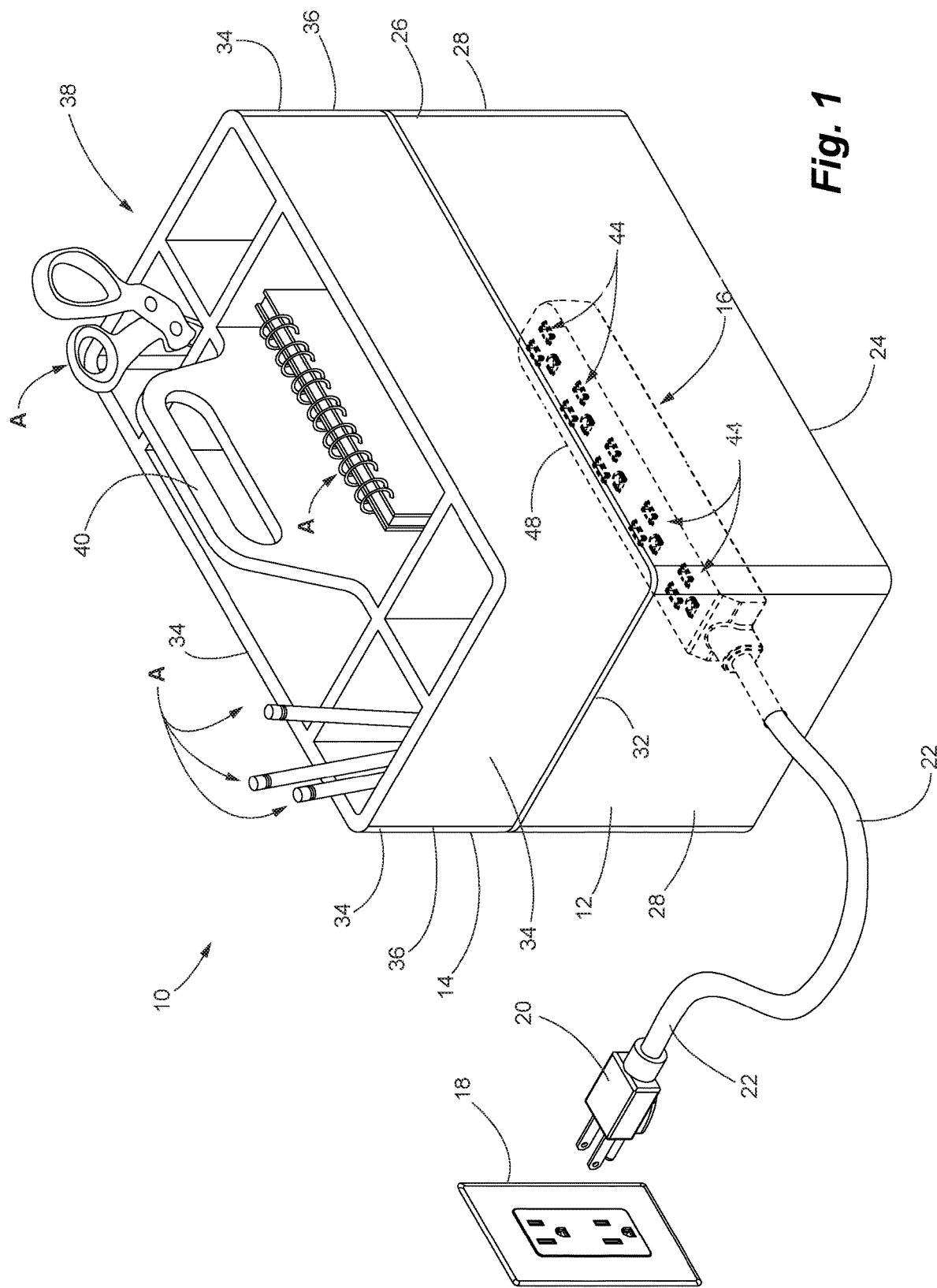
FIG. 1 is a right side perspective view of a storage tote with electrical outlets, in accordance with the present invention.

Referring now to the drawings and the illustrative embodiments depicted therein, a storage tote assembly 10 provides storage space for loose articles A, both in a lower storage bin 12 and in an upper storage tote 14 that attaches to an upper end of the storage bin 12 (FIGS. 1-3). A power strip 16 (FIGS. 1 and 3) is positioned inside lower storage bin 12 and provides a user of the storage tote assembly with access to electrical power for charging portable electronic devices such as mobile phones, tablet computers and laptop computers, cameras, media players, and the like, or for powering tools or appliances. When storage tote assembly 10 is used for craft supplies, power strip 16 may be connected to an outside power source, such as a 110V AC wall outlet 18 engaged by a plug 20 at the end of a power cord 22 connected to power strip 16 (FIG. 1), such as for powering a hot glue gun, lighting, a fan, a hand-held drill or rotary tool, or the like.

Lower storage bin 12 has a bottom panel 24 (FIG. 3) and four substantially planar bin sidewalls 26 extending upwardly from bottom panel 24. In the illustrated embodiment, bin sidewalls 26 include two longer sidewalls and two shorter end walls in a rectangular arrangement, with curved corner regions 28 adjoining the adjacent sidewalls 26. Bottom panel 24, bin sidewalls 26, and corner regions 28 cooperate to define a lower storage chamber 30 having an open top that receives and supports upper storage tote 14. Storage chamber 30 is capable of storing loose articles A in addition to power strip 16, which may be fixedly or removably mounted to bottom panel 24 as shown, or to another surface such as one of sidewalls 26. For example, power strip 16 may be secured to bottom panel 24 or to the inwardly-facing surface of any of the sidewalls 26 using hook-and-loop fasteners, rivets or screws, magnets, snap buttons, latch tabs, studs and corresponding keyhole slots, adhesives or ultrasonic welding, or substantially any suitable securing method. Securing elements or structures may be placed in different locations on one or more interior surfaces of lower storage bin 12 to provide a user with more than one optional mounting location for power strip 16. Optionally, a housing of the power strip may be unitarily formed with a portion of the lower storage bin to provide a seamless and permanent power strip location.

In the illustrated embodiment, one of the shorter end walls 26 defines an opening 31 just above bottom panel 24, where power cord 22 exits lower storage chamber 30, such as shown in FIG. 2. Optionally, substantially the entire power cord 22 can be passed through opening 31 for storage in the lower storage chamber 30, such as when power strip 16 is not in use. Power cord 22 may be coiled or bundled loosely in lower storage chamber 30, or a winding reel or retractor may be provided for storing the power cord when it is not in use.

Upper storage tote 14 has a bottom tote panel 32 (FIG. 1) and four substantially planar tote sidewalls 34 (FIGS. 1-3) extending upwardly from bottom tote panel 32. In the illustrated embodiment, tote sidewalls 34 include two longer sidewalls and two shorter end walls in a rectangular arrangement, with curved corner regions 36, such that the overall footprint of upper storage tote 14 is substantially similar or the same as that of lower storage bin 12. Bottom tote panel 32, tote sidewalls 34, and corner regions 36 cooperate to define an uncovered upper storage area 38 that is divided into separate compartments or zones by a plurality of divider walls 42, one of which has an upwardly-extending portion having an elongate opening that forms a carry-handle 40, which can be used to carry the entire storage tote assembly 10 when upper storage tote 14 is secured to the lower storage bin 12.

Bottom tote panel 32, tote sidewalls 34, and tote corner regions 36 may be sized and shaped to fit just inside or atop the upper edges or upper regions of bin sidewalls 26 and corner regions 28, so that upper storage tote 14 is supported at an upper region of lower storage bin 12 without sinking into lower storage chamber 30. Although the overall shape of both lower storage bin 12 and upper storage tote 14 are rectangular with rounded corners, when viewed from above, it will be appreciated that other shapes are also possible (including, but not limited to, circular or oval, triangular, pentagonal or other polygons), without departing from the spirit and scope of the present invention. It will also be appreciated that various suitable materials may be used to form lower storage bin 12 and upper storage tote 14, including resinous plastic, composites, metal, fabric, wood, and the like, or combinations thereof.

One or more releasable securing elements 43 are provided to attach upper storage tote 14 to lower storage bin 12 (FIGS. 2 and 3), so that the complete storage tote assembly 10 can be lifted or transported by grasping handle 40. Such securing elements 43 can be any suitable attachment device or mechanism, including buckles, latches, hasps, straps, snap buttons, magnetic fasteners, a zipper, hook-and-loop fasteners, slide fasteners, and the like, and combinations of those. Although upper storage tote 14 may be completely removable from lower storage bin 12 when the securing elements 43 are released, it is further envisioned that in some embodiments, the upper storage tote may be hingedly attached to lower storage bin such as with a fabric hinge, a living hinge (e.g., of resinous plastic), or a pinned hinge such as a piano hinge. It will be appreciated that for hinged embodiments, it may be advantageous to provide some type of cover to help contain loose articles in the upper storage area of the upper storage tote, to prevent the articles from spilling out when the upper storage tote is pivoted open to permit access to the lower storage chamber of the lower storage bin.

Figure 4:
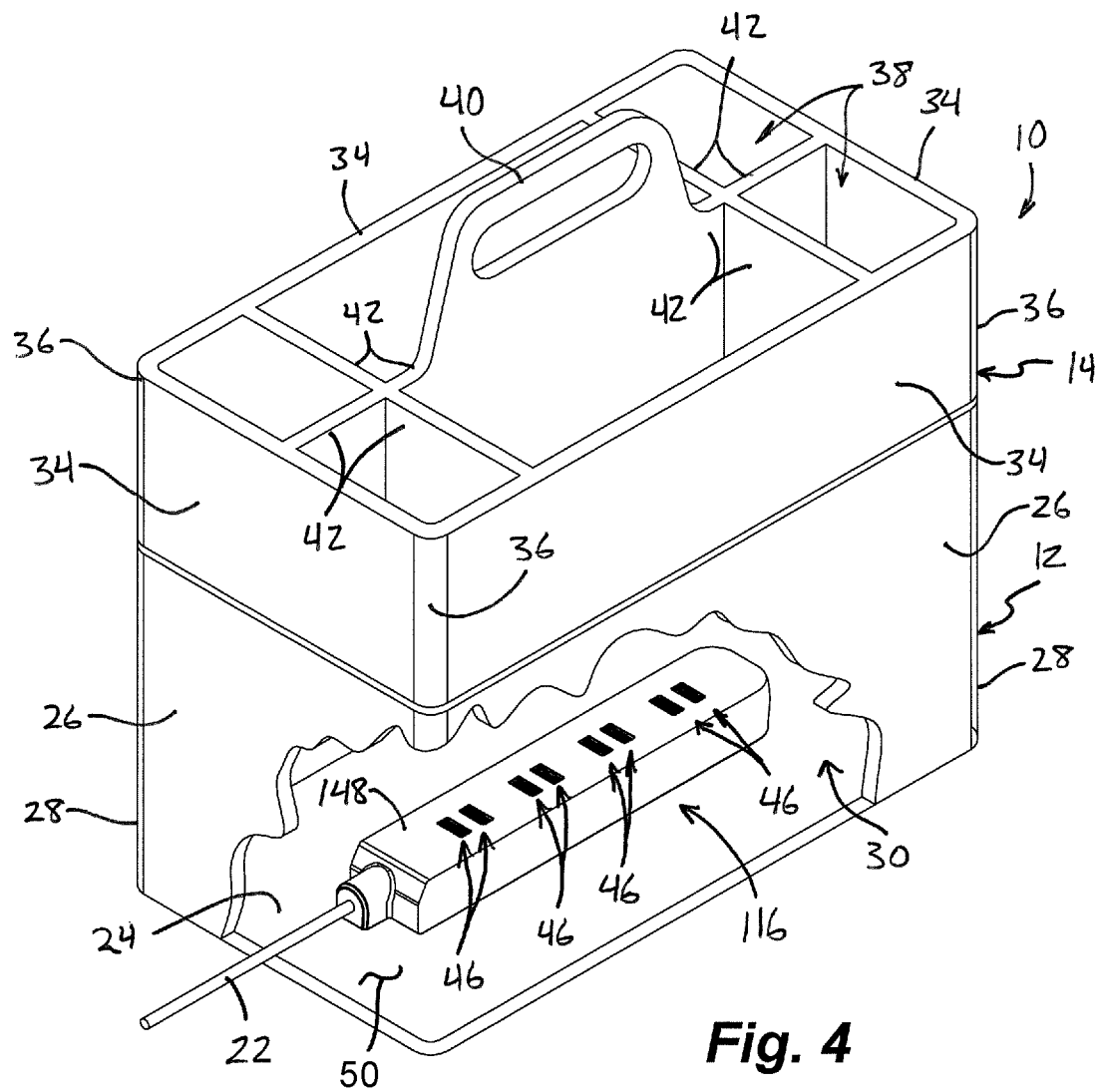
FIG. 4 is another upper perspective view of the storage tote with portions cut away to show internal structure, and fitted with a low voltage DC power strip.

Power strip 16 includes a plurality of high voltage AC power outlets or receptacles 44 and a plurality of low voltage DC power outlets or receptacles 46, which are mounted together in an outlet housing 48 as shown in FIG. 3. Outlet housing 48 may be permanently or releasably attached to an upper surface 50 of bottom panel 24, such as shown in FIG. 3, or may be loosely contained in lower storage chamber 30, or may be secured to another surface such as one of the bin sidewalls 26. In the illustrated embodiment of FIGS. 1 and 3, high voltage AC power outlets 44 are 110V NEMA receptacles and low voltage DC power outlets 46 are USB-style receptacles, such as USB-A and/or USB-C power-only receptacles, although it will be appreciated that other types, styles, voltages, and capacities of outlets may be provided without departing from the spirit and scope of the present invention. It is further envisioned that the power strip may include only one or more high voltage AC outlets, or only one or more low voltage DC outlets, such as a power strip 116 with housing 148, and fitted with eight low voltage DC power outlets 46 (FIG. 4).

When both high voltage AC power outlets 44 and low voltage DC power outlets 46 are provided in the same power strip 16, which is supplied with only high voltage AC power from plug 20 and power cord 22, an electrical power converter located in outlet housing 48 converts the incoming high voltage AC power to a low voltage DC power output that is supplied to the low voltage DC power outlets 46. High voltage AC power received from power cord 22 is routed directly to the high voltage AC power outlets 44. Optionally, a wireless power transmitter may be provided inside the lower storage chamber 30, such as along the outlet housing 48, to wirelessly convey electrical power to at least one portable electrical or electronic device that is also located in the lower storage chamber 30. Another wireless embodiment will be described below in more detail. It is further envisioned that one or more electrical outlets may be mounted so as to be accessible along an outer surface of lower storage bin 12, thus providing access to electrical power at the storage tote assembly even when the upper storage tote 14 is secured to lower storage bin 12.

Optionally, the portability of storage tote assembly 10 can be enhanced by providing an electrical power storage device such as a battery, capacitor, super capacitor, fuel cell, or the like, for energizing the electrical outlets without requiring a constant connection to an outside power source such as wall outlet 18. It is envisioned that such an electrical power storage device would be contained in lower storage chamber 30, and possibly in a modified power outlet housing, and would preferably be rechargeable so as to allow repeated uses without replacing the electrical power storage device. Typically such an electrical power storage device would only be used to energize low voltage DC electrical outlets, although it is envisioned that a power inverter could be provided for converting the DC power output of an electrical power storage device to high voltage AC power. Control circuitry may be used to direct charging power to the electrical power storage device, from the storage device to one or more outlets, and through any electrical power converters as appropriate.

Figure 5A:
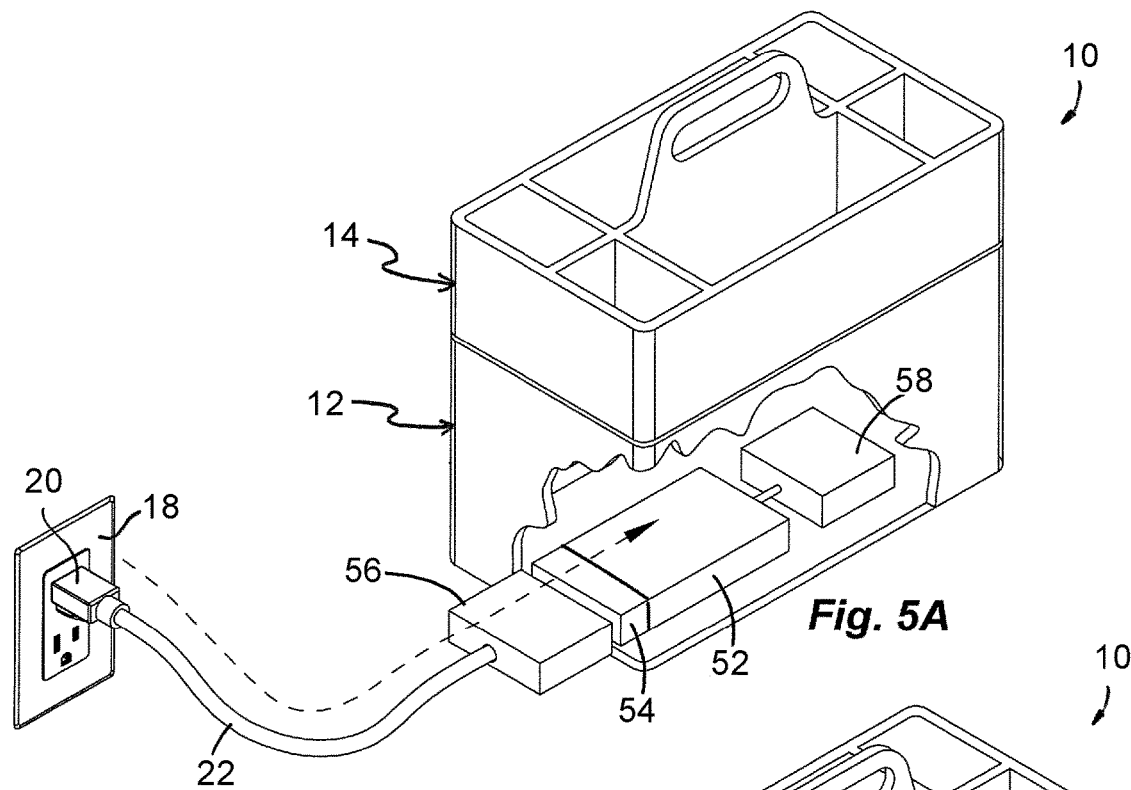
FIG. 5A is another upper perspective view of the storage tote with portions cut away to show internal structure, depicting wireless charging of an onboard battery.
Figure 5B:
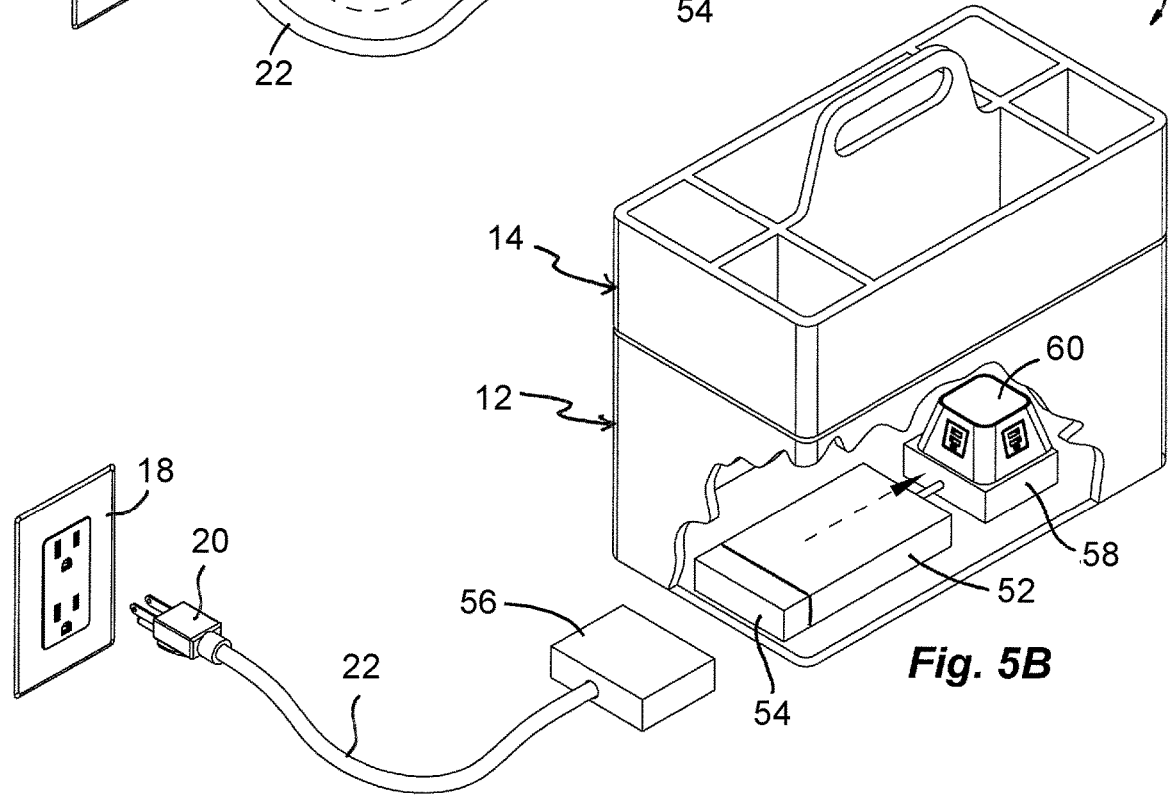
FIG. 5B is another upper perspective view of the storage tote of FIG. 5A, depicting wireless charging of an onboard battery and wireless charging of a low voltage DC power monument.

It is envisioned that a rechargeable-type electrical power storage device could be recharged via a direct-contact power connection, such as to wall outlet 18 via power cord 22 and plug 20, or by wireless electrical power transmission technologies such as magnetic resonance field induction, electric field resonant capacitive coupling, or direct-contact pads with "lanes" of electrical conductors having opposite polarities, for example. With reference to FIGS. 5A and 5B, wireless charging of an onboard electrical power storage device 52 may be accomplished by providing a wireless power receiver 54 along the bottom panel 24 or at least one bin sidewall 26, which receiver 54 is configured to wirelessly receive electrical power from a remotely located wireless power transmitter 56. Power transmitter 56 may be a portable unit that receives power from a wall or floor outlet 18 via a plug 20 and cord 22. The wireless power receiver 54 conveys the electrical power to the electrical storage device 52 to thereby recharge the electrical storage device 52, as indicated by a dashed-line arrow in FIG. 5A, so that the storage device 52 can then be used to energize one or more direct-contact outlets 46 as described above, or to energize a wireless charging output device 58 as indicated by a dashed-line arrow in FIG. 5B.

Optionally, wireless charging output device 58 can be used to supply electrical energy to a fixed or portable electrical power monument 60 (FIG. 5B), such as of the type that is more fully described in commonly-owned U.S. patent application Ser. No. 15/062,944, filed Mar. 7, 2016 (U.S. Publication No. 2016/0268825), now U.S. Pat. No. 10,181,735, which is hereby incorporated herein by reference in its entirety. It will further be appreciated that brackets or other mounting provisions for securing and charging batteries associated with hand-held cordless power tools, mobile phones, cameras, and the like may be permanently or detachably mounted inside the lower storage chamber 30. Such charging mounts or brackets may also be incorporated into a power strip.

Thus, the storage tote assembly provides a convenient device for storing and transporting loose articles, while also providing electrical outlets for powering or recharging portable electronic devices or other appliances. The electrical outlets may be energized by plugging an associated power cord into a nearby electrical outlet or establishing a wireless power transmission from an outside source, and in some embodiments, the electrical outlets may be energized by an onboard electrical power storage device so that no direct or wireless connection to an outside power source is required, at least for a limited time.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A storage tote assembly comprises:
   a lower storage bin having a bottom panel and at least one bin sidewall extending upwardly from said bottom panel and cooperating with said bottom panel to define a lower storage chamber, wherein said lower storage chamber is configured to store loose articles;
   an upper storage tote having a lower portion and at least one tote sidewall defining an outer perimeter and cooperating with said lower portion to define an upper storage area, wherein said upper storage tote is supported by said at least one bin sidewall, and wherein said lower portion of said upper storage tote is releasably coupled to said at least one bin sidewall at said open top, and wherein said upper storage tote is configured to support loose articles in said upper storage area;
   a plurality of divider walls extending through and subdividing said upper storage area, at least a subset of said divider walls spanning fully across said upper storage area between different regions of said at least one tote sidewall, said divider walls comprising a center divider wall extending centrally through said upper storage area;
   a single carry handle extending upwardly from said center divider wall, said carry handle projecting above said at least one tote sidewall and said plurality of divider walls, wherein said carry handle is configured to permit carrying said upper storage tote and said lower storage bin together as a unit when said storage tote is releasably coupled to said lower storage bin;
   a securing element for releasably attaching said upper storage tote to said at least one bin sidewall at said open top;
   at least one electrical power outlet mounted inside said lower storage chamber at one of said bottom panel and said at least one bin sidewall, and operable to supply electrical power to a portable electrical or electronic device;

an electrical storage device disposed in said lower storage chamber, wherein said electrical storage device is in electrical communication with said at least one electrical outlet;

a wireless power receiver positioned along said bottom panel or said at least one bin sidewall and operable to wirelessly receive electrical power from a remotely located wireless power transmitter, and to convey the electrical power to said electrical storage device to thereby recharge said electrical storage device; and an internal wireless power transmitter disposed in said lower storage chamber and operable to receive electrical power from said electrical storage device and wirelessly convey the electrical power to at least one portable electrical or electronic device positioned in said lower storage chamber;

wherein said at least one electrical power outlet, said internal wireless power transmitter, and said lower storage chamber are accessible via said open top upon separation of said upper storage tote from said lower storage bin.

2. The storage tote assembly of claim 1, further comprising a portable electrical power monument supported at said internal wireless power transmitter, said portable electrical power monument comprising:

a low voltage DC electrical outlet;

a rechargeable battery; and a monument wireless power receiver operable to receive electrical power from said internal wireless power transmitter and to convey the electrical power to at least one of said rechargeable battery and said low voltage DC electrical outlet;

wherein said portable electrical power monument is accessible and removable through said open top upon separation of said upper storage tote from said lower storage bin.

* * * * *